March 18, 1924.
T. TOLLEFSON ET AL
DUST GUARD
Filed April 26, 1920
1,487,624
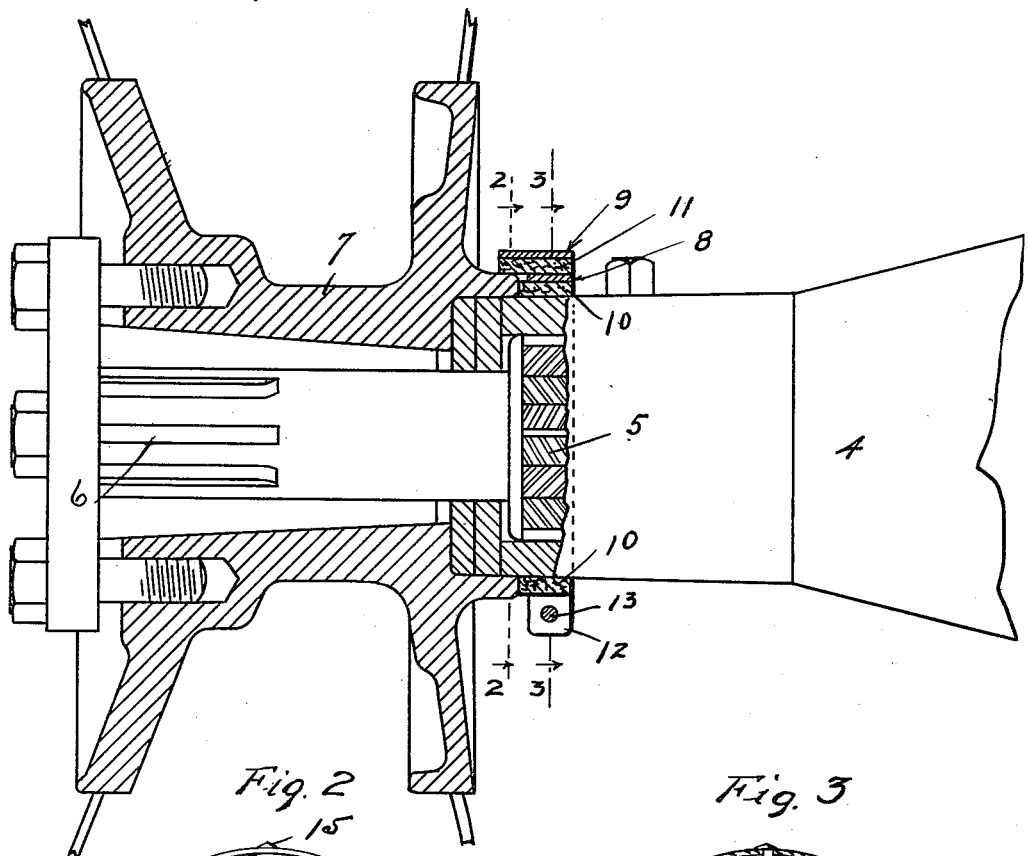
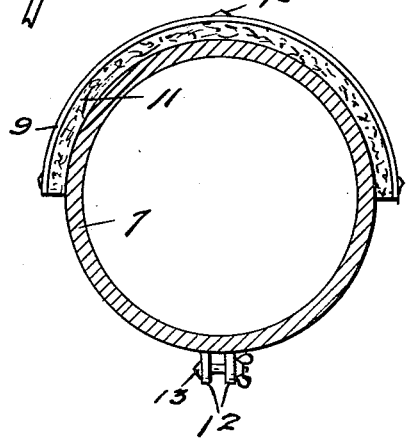
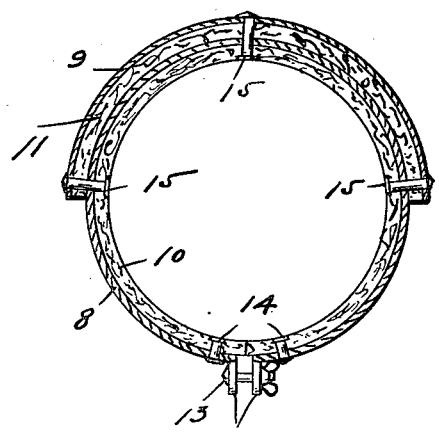
Inventors
Tollak Tollefson
George Merklin
By their Attorneys
Williamson Merchant Patented Mar. 18, 1924.

1,487,624

UNITED STATES PATENT OFFICE.

TOLLAK TOLLEFSON AND GEORGE MERKLIN, OF BONILLA, SOUTH DAKOTA.

DUST GUARD.

Application filed April 26, 1920. Serial No. 376,492.

*To all whom it may concern:*

Be it known that we, TOLLAK TOLLEFSON and GEORGE MERKLIN, citizens of the United States, residing at Bonilla, in the county of Beadle and State of South Dakota, have invented certain new and useful Improvements in Dust Guards; and we do hereby declare the following to be a full, clear, and exact description of the invention, such as will enable others skilled in the art to which it appertains to make and use the same.

Our present invention relates to improvements in dust guards for vehicle wheels, and has for its object to provide such a guard that is especially adapted for use in connection with tractors or other motor-driven vehicles.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary view partly in elevation and partly in section illustrating in part the rear axle housing and one of the wheels of a tractor to which the invention is applied;

Fig. 2 is a transverse section taken on the line 2—2 of Fig. 1; and

Fig. 3 is a transverse section taken on the line 3—3 of Fig. 1.

Of the parts of the tractor illustrated, the numeral 4 indicates the rear axle housing, within which is mounted, on roller bearings 5, an axle 6 to which is secured a rear wheel 7.

The invention comprises main and supplemental clamping bands 8 and 9, respectively, and main and supplemental linings 10 and 11, respectively. Said main clamping band 8 is of annular form and transversely divided. The ends of the main clamping band 8 are bent laterally outward to afford a pair of perforated ears 12, through which is inserted a thumb-nut-equipped draw-bolt 13.

The main lining 10 is of the same form as the main clamping band 8 and is secured thereto at its ends by rivets 14. Said main clamping band 8 is adapted to be applied around the housing 4 and it is important to note that the outer edge of the main lining 10 is extended outward of the said clamping band for contact with the inner end of the hub of the wheel 7. The supplemental clamping band is of arcuate form and fits around the upper portion of the main clamping band 8 and is secured thereto by rivets 15. The supplemental lining 11 is interposed between the main and supplemental clamping bands and is secured to each band by the rivets 15.

It is important to note that the supplemental clamping band 9 and supplemental lining 11 are extended materially outward of the extended edge of the main lining 10 and overlap the upper half of the inner end of the hub of the wheel 7.

In applying the improved dust guard in position, the thumb-nut-equipped bolt 13 is removed from the ears 12 to permit the main clamping band 8 and main lining 10 to be opened up and applied around the housing 4. The bolt 13 is then inserted through the ears 12 and tightened to draw the ends of the main clamping band toward each other and thereby tightly press the lining 10 onto the housing 4. Before the bolt 13 is tightened, the dust guard is forced toward the wheel 7 to press the projecting edge of the main lining 10 against the hub of said wheel.

The purpose of the supplemental clamping band 9 is to hold the arcuate supplemental lining 11 against the upper half of the hub of the wheel 7, and it also affords means for securing said lining to the main clamping band 8. Obviously, the main and supplemental linings completely close the joint between the hub of the wheel 7 and housing 4 and thereby prevent dust and dirt from drifting therein and getting into the wheel bearings.

The above described invention, while extremely simple and of comparatively small cost to manufacture, has, in actual usage, proven highly efficient for the purpose had in view. The improved dust guard can be very quickly applied to a housing or removed therefrom, and when the linings are worn out, new ones may be substituted therefor.

The primary object of the supplemental lining 11 is to cover the upper portion of the joint between the wheel hub and axle and thereby prevent dirt and dust carried upward by the wheel from getting therein.

What we claim is:

1. A dust guard comprising main and supplemental clamping bands, and main and supplemental pliable linings, the main lining being secured within the main clamping band and the supplemental lining being interposed between the main and supplemental clamping bands, said supplemental clamping band and lining being secured to said main clamping band and extended outward of one edge of the main lining, and means for securing said parts in operative position.

2. In a tractor having a cylindrical axle housing, a wheel rotating adjacent thereto, a dust guard comprising main and supplemental clamping bands secured together, one within the other, and having their surfaces parallel to the surface of the housing, main and supplemental linings, the former inside of the main band and the latter between the main and supplemental bands, and means for clamping the main band and lining to the housing.

3. A dust guard comprising concentric flat bands, one of which is substantially cylindrical, and the other of which is arcuate, a cylindrical lining disposed inside of and secured to the cylindrical band and a supplemental lining disposed between said bands, said bands and linings being secured together, and means for clamping the cylindrical band and lining in position.

4. In an axle housing and a wheel hub rotatably mounted adjacent thereto and having a shoulder extending thereover, a dust guard comprising an annular main clamping band, a main lining secured to the inside thereof and adapted to be clamped in contact with said axle and against the end of said hub, a supplemental arcuate band of greater width than said main band, flush therewith and with one edge secured to said band, a supplemental lining between said bands of substantially the same width as said supplemental band and arranged to extend over the edge of said hub, and means for securing said main clamping band to said axle housing.

In testimony whereof we affix our signatures in presence of two witnesses.

TOLLAK TOLLEFSON.
GEORGE MERKLIN.

Witnesses:
CARL THORSEN WESTBY,
ROBERT KENYON.